(12) United States Patent
Betts et al.

(10) Patent No.: US 11,010,306 B2
(45) Date of Patent: May 18, 2021

(54) APPARATUS AND METHOD FOR MANAGING A CACHE HIERARCHY

(71) Applicant: Arm Limited, Cambridge (GB)

(72) Inventors: Andrew Campbell Betts, Cambridge (GB); Max Nicholas Holland, Cambridge (GB)

(73) Assignee: Arm Limited, Cambridge (GB)

( * ) Notice: Subject to any disclaimer, the term of this patent is extended or adjusted under 35 U.S.C. 154(b) by 4 days.

(21) Appl. No.: 16/166,422

(22) Filed: Oct. 22, 2018

(65) Prior Publication Data

US 2020/0125498 A1 Apr. 23, 2020

(51) Int. Cl.
*G06F 12/0897* (2016.01)
*G06F 12/128* (2016.01)
*G06F 12/0862* (2016.01)

(52) U.S. Cl.
CPC ...... *G06F 12/0897* (2013.01); *G06F 12/0862* (2013.01); *G06F 12/128* (2013.01)

(58) Field of Classification Search
CPC ............ G06F 12/0897; G06F 12/0862; G06F 12/128; G06F 12/123; G06F 2212/1044; G06F 2212/452
USPC ........................................................ 711/122
See application file for complete search history.

(56) References Cited

U.S. PATENT DOCUMENTS

| | | | | |
|---|---|---|---|---|
| 8,347,037 | B2 * | 1/2013 | Guthrie | G06F 12/0897 711/122 |
| 8,423,715 | B2 * | 4/2013 | Heil | G06F 12/122 711/118 |
| 9,678,874 | B2 * | 6/2017 | Nellans | G06F 3/0679 |
| 10,055,360 | B2 * | 8/2018 | Greenspan | G06F 12/123 |
| 2006/0143396 | A1 * | 6/2006 | Cabot | G06F 12/126 711/134 |
| 2010/0191916 | A1 * | 7/2010 | Balakrishnan | G06F 12/0808 711/134 |

(Continued)

OTHER PUBLICATIONS

M. Chaudhuri, "Pseudo-LIFO: The foundation of a new family of replacement policies for last-level caches," 2009 42nd Annual IEEE/ACM International Symposium on Microarchitecture (MICRO), New York, NY, 2009, pp. 401-412.*

(Continued)

*Primary Examiner* — Pierre Miche Bataille
(74) *Attorney, Agent, or Firm* — Nixon & Vanderhye P.C.

(57) ABSTRACT

An apparatus and method are provided for managing a cache hierarchy. The apparatus has processing circuitry for executing instructions, and a cache hierarchy for storing content for access by the processing circuitry when executing those instructions. The cache hierarchy has a plurality of levels of cache including a highest level of cache that is accessed prior to the other levels of cache in response to a request from the processing circuitry. Eviction control circuitry is provided in association with each level of cache, and the eviction control circuitry associated with a chosen level of cache in arranged to implement a most recently read eviction policy that causes content most recently read from the chosen level of cache to be selected for eviction from that chosen level of cache. It has been found that such an approach can significantly increase the effective cache capacity within the cache hierarchy, without the complexities often associated with other schemes.

12 Claims, 7 Drawing Sheets

(56) References Cited

U.S. PATENT DOCUMENTS

2013/0111139 A1\* 5/2013 Balakrishnan ...... G06F 12/0808
711/122
2013/0219328 A1\* 8/2013 Rosen ................... G06F 3/0481
715/781
2017/0188502 P1\* 6/2017 Probst ................. G06F 12/0808

OTHER PUBLICATIONS

C. A. Basu, N. Kirman, M. Kirman, M. Chaudhuri and J. Martinez, "Scavenger: A New Last Level Cache Architecture with Global Block Priority," 40th Annual IEEE/ACM International Symposium on Microarchitecture (MICRO 2007), Chicago, IL, 2007, pp. 421-432.\*

B. M. Chaudhuri, J. Gaur, N. Bashyam, S. Subramoney and J. Nuzman, "Introducing Hierarchy-awareness in replacement and bypass algorithms for last-level caches," 2012 21st International Conference on Parallel Architectures and Compilation Techniques (PACT), Minneapolis, MN, 2012, pp. 293-304.\*

A. V. Nori, J. Gaur, S. Rai, S. Subramoney and H. Wang, "Criticality Aware Tiered Cache Hierarchy: A Fundamental Relook at Multi-Level Cache Hierarchies," 2018 ACM/IEEE 45th Annual International Symposium on Computer Architecture (ISCA), Los Angeles, CA, 2018, pp. 96-109.\*

\* cited by examiner

APPARATUS AND METHOD FOR MANAGING A CACHE HIERARCHY

BACKGROUND

The present technique relates to an apparatus and method for managing a cache hierarchy.

In a data processing apparatus, it is known to provide a cache hierarchy between the processing circuitry used to execute instructions and main memory, the cache hierarchy being used to store content for access by the processing circuitry when executing the instructions, with the aim of providing quicker access to that content than would be the case if the content had to be accessed in main memory. The content stored in the cache hierarchy may comprise instructions to be executed by the processing circuitry and/or data values to be operated on when executing those instructions.

The individual caches within the cache hierarchy can be organised with respect to each other in a variety of ways. It is typically the case that the caches closer to the processing circuitry (i.e. the ones that are accessed first when an access request is issued by the processing circuitry) have a smaller capacity than the caches further away from the processing circuitry. Accesses to a cache will typically be quicker when the cache is of a smaller size, and accordingly such an arrangement enables faster access to the content when it is in one of the caches closer to the processing circuitry.

It is also often desirable to seek to increase the effective capacity of cache storage within the cache hierarchy so as to increase the amount of content that can be retained within the cache hierarchy at any point in time. One known way to seek to increase the effective capacity between two adjacent levels of cache is to arrange for those caches to operate as exclusive caches. In accordance with an exclusive cache arrangement, any item of content will only be cached in one of the caches at any particular point in time. However, operating caches in a fully exclusive arrangement requires significant overhead in terms of the complexity of the control circuitry required to maintain the exclusive arrangement between the caches.

Accordingly, it would be desirable to provide alternative techniques for increasing the effective cache capacity.

SUMMARY

In one example arrangement, there is provided an apparatus comprising: processing circuitry to execute instructions; a cache hierarchy to store content for access by the processing circuitry when executing the instructions, the cache hierarchy comprising a plurality of levels of cache including a highest level of cache that is accessed prior to the other levels of cache in response to a request from the processing circuitry; and eviction control circuitry provided in association with each level of cache, where the eviction control circuitry associated with a chosen level of cache is arranged to implement a most recently read eviction policy that causes content most recently read from the chosen level of cache to be selected for eviction from the chosen level of cache.

In another example arrangement, there is provided a method of managing a cache hierarchy within an apparatus, comprising: providing processing circuitry to execute instructions; employing the cache hierarchy to store content for access by the processing circuitry when executing the instructions, the cache hierarchy comprising a plurality of levels of cache including a highest level of cache that is accessed prior to the other levels of cache in response to a request from the processing circuitry; and arranging eviction control circuitry associated with a chosen level of cache to implement a most recently read eviction policy that causes content most recently read from the chosen level of cache to be selected for eviction from the chosen level of cache.

In a still further example arrangement, there is provided an apparatus comprising: processing means for executing instructions; cache hierarchy means for storing content for access by the processing means when executing the instructions, the cache hierarchy means comprising a plurality of levels of cache including a highest level of cache that is accessed prior to the other levels of cache in response to a request from the processing means; and eviction control means provided in association with each level of cache, where the eviction control means associated with a chosen level of cache is for implementing a most recently read eviction policy that causes content most recently read from the chosen level of cache to be selected for eviction from the chosen level of cache.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

An apparatus in accordance with one example arrangement has processing circuitry for executing instructions, and a cache hierarchy that is used to store content for access by the processing circuitry when executing the instructions. The cache hierarchy has a plurality of levels of cache, including a highest level of cache that is accessed prior to the other levels of cache in response to a request from the processing circuitry. Further, eviction control circuitry is provided in association with each level of cache, and the eviction control circuitry associated with a chosen level of cache is arranged to implement a most recently read eviction policy that causes content most recently read from the chosen level of cache to be selected for eviction from the chosen level of cache.

This is an entirely counter-intuitive approach to take, since it is often the case that eviction policies seek to identify content that has become stale, i.e. is unlikely to be needed, examples of such eviction policies being a least recently used eviction policy. Nevertheless, within a cache hierarchy the inventors realised that at certain levels of cache it may improve effective cache capacity if the most recently read content is evicted. In particular, even though the fact that an item of content has been most recently read implies that that content is still very much of relevance to the operations being performed by the processing circuitry, the eviction of the most recently read content from certain levels of cache can increase the effective capacity of the cache without the requirement to introduce complex cache management techniques, such as would be required if employing the earlier-described fully exclusive cache approach.

For example, if the chosen level of cache is a level of cache other than the highest level of cache, then it is likely that the most recently read cache line will then be resident within a higher level of cache. It has been found that there are many situations where that content will then remain in the higher level of cache whilst it is being used by the processing circuitry, and accordingly by preferentially selecting that most recently read content for eviction, this improves the likelihood that the allocation of new content into the chosen level of cache will not overwrite content that is likely to be read soon. It has been found that the use of a most recently read eviction policy in accordance with a chosen level of cache other than the highest level of cache can give significant effective cache capacity increase benefits without the complexity of known schemes such as employing a fully exclusive policy between adjacent caches.

In one example arrangement, prefetch circuitry is provided in association with the chosen level of cache to prefetch content into the chosen level of cache in anticipation of a request for that content being received by the chosen level of cache. The use of the most recently read eviction policy can operate particularly effectively in combination with prefetch circuitry that is also provided in association with the chosen level of cache. In particular, when the prefetch circuitry is operating effectively, it will cause content to be retrieved into the chosen level of cache before a request for that content is received, and hence before that content is read from the chosen level of cache. Accordingly, once a particular item of content has been read from the chosen level of cache, and is then subsequently evicted when applying the most recently read eviction policy, the prefetch circuitry can be used to anticipate when that content is again likely to be needed, and to prefetch that content into the chosen level of cache ahead of that point in time. Hence, the fact that the most recently read content has been evicted may not give rise to any performance impact later, since the prefetch circuitry may ensure that it is re-fetched if it is needed again in the future so that it is available for access when subsequently requested.

In one example arrangement, the content stored in the cache hierarchy comprises instructions to be executed by the processing circuitry. Is has been found that employing the most recently read eviction policy scheme as discussed above in association with instructions can provide a particularly effective mechanism for increasing effective cache capacity. In particular, once an instruction has been promoted from the chosen level of cache to a higher level of cache, it is often the case that that instruction will remain at that higher level of cache for a period of time whilst it is needed by the processing circuitry, As a particular example, it may be that the instruction is part of a small loop of instructions that is repetitively executed by the processing circuitry a number of times, and once that instruction has been promoted from the chosen level of cache to an adjacent higher level of cache to service a first iteration of the loop, it will remain at the higher level of cache whilst the loop is repetitively executed, and hence will not need to be read again from the chosen level of cache. Accordingly, by evicting the cache line containing such instructions in accordance with the most recently read eviction policy, the process can emulate much of the effective cache capacity improvements of operating a fully exclusive policy between the chosen level of cache and the adjacent higher level of cache, but without the complexity associated with managing such an exclusive arrangement.

Further, it is often the case that prefetch circuitry operates in a reliable manner in association with instruction prefetching, and hence if the instruction flow is such that an instruction evicted in accordance with the most recently read eviction policy is in due course required again, it is likely to be prefetched into the chosen level of cache ahead of a request for that instruction being received by the chosen level of cache.

However, whilst the techniques have been found to work particularly effectively in association with instructions, the techniques are not limited thereto, and hence in an alternative implementation the contents stored in the cache hierarchy may comprise the data processed by the processing circuitry when executing instructions. As with the use in association with instructions, situations may arise where use of the most recently read eviction policy in association with data held in one or more chosen levels of cache can give rise to significant effective cache capacity increases, particularly when employed in association with suitable prefetch circuitry used to prefetch data into those chosen levels of cache.

As mentioned earlier, in one example implementation, the chosen level of cache with which the most recently read eviction policy is used is a level of cache other than the highest level of cache. In an example arrangement the eviction control circuitry provided in association with the highest level of cache implements an eviction policy other than the most recently read eviction policy. For example, it could apply any of a number of known standard eviction policies, such as a least recently used eviction policy.

In one example arrangement, the chosen level of cache is a level of cache adjacent to the highest level of cache. By operating the chosen level of cache using the most recently read eviction policy, then the highest level of cache and chosen level of cache can collectively operate with an increased effective cache capacity, achieving much of the benefit that could be achieved from implementing a fully exclusive policy but without the administrative overhead.

In one implementation, the content is read from the chosen level of cache in response to an access request issued in association with an adjacent higher level of cache. The access request may arise for a number of reasons. For example, the access request issued in association with the adjacent higher level of cache may be a demand access request issued by the adjacent higher level of cache, such a situation arising for example when the processing circuitry has requested content that is not yet stored in that adjacent higher level of cache. Alternatively, or in addition, the access request issued in association with the adjacent higher level of cache may be a prefetch request issued by prefetch circuitry provided in association with the adjacent higher level of cache. Hence, that prefetch circuitry will be seeking to predict the demand access requests that will be received by the adjacent higher level of cache, and to prefetch content into that cache ahead of it being requested by a demand access request.

If desired, more than one level of cache may be arranged to implement the most recently read eviction policy.

The individual caches within the cache hierarchy can be organised in a variety of ways. However, in one example arrangement the content is stored in cache lines, and the most recently read eviction policy causes a cache line containing content most recently read from the chosen level of cache to be selected for eviction from the chosen level of cache.

Particular examples will now be described with reference to the Figures.

Figure 1:
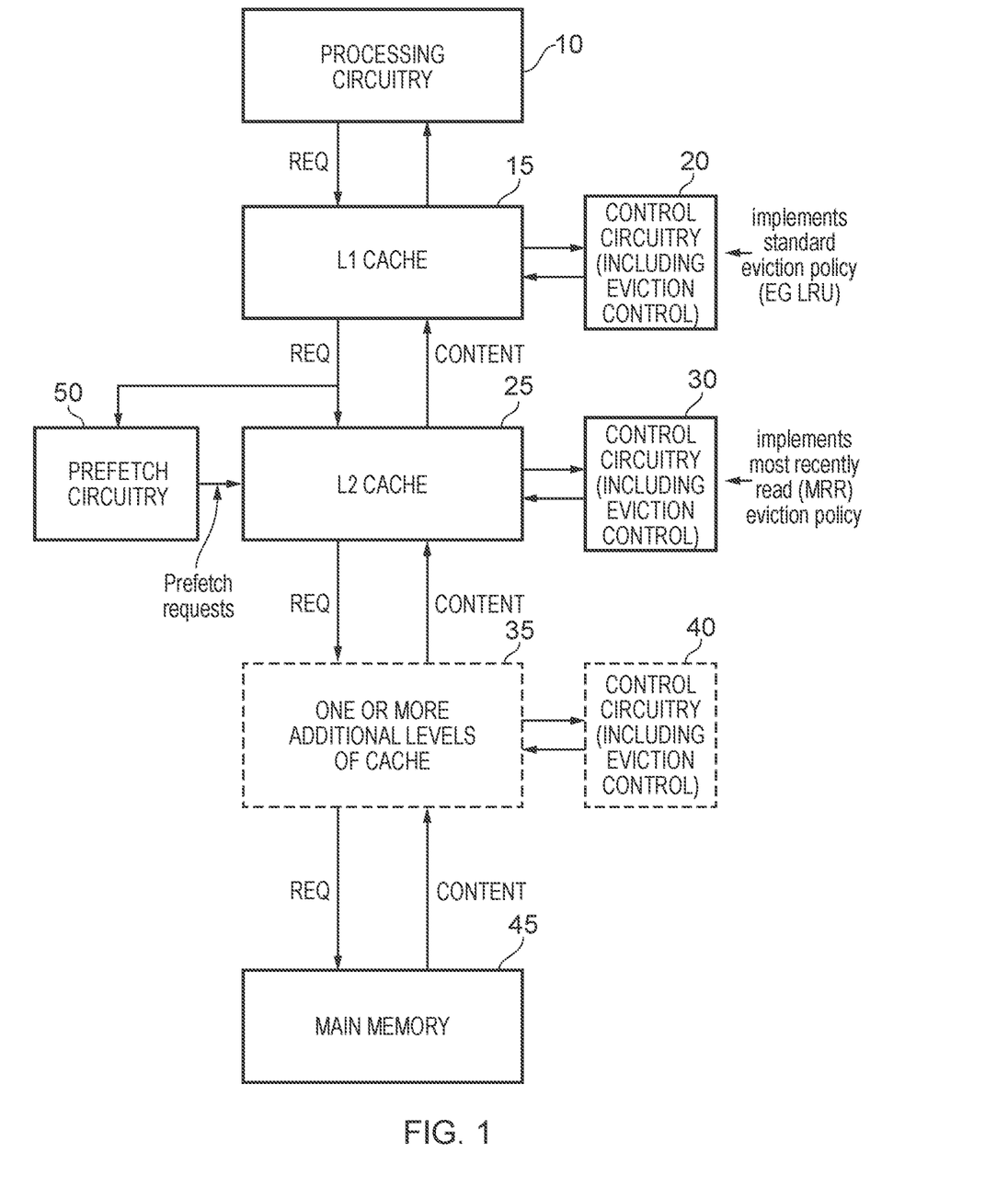
FIG. 1 is a block diagram of an apparatus in accordance with one example arrangement.

FIG. 1 is a block diagram of an apparatus in accordance with one example arrangement. Processing circuitry 10 is provided for executing instructions. The processing circuitry 10 is coupled to main memory 45 via a cache hierarchy consisting of multiple levels of cache 15, 25, 35. In particular, a level 1 cache is connected to the processing circuitry, and the processing circuitry may issue requests specifying an address of content that is required by the processing circuitry. The content may comprise instructions to be executed by the processing circuitry and/or data values to be manipulated by the processing circuitry when executing those instructions. The system may include separate caches for instructions and data values, but typically at least one or more of the lower levels of cache (i.e. those more remote from the processing circuitry) are unified caches that store both instructions and data. Whilst the techniques described herein may be used in association with either instruction caching or data value caching, for the purposes of the following discussion it will be assumed that the techniques are applied in respect of instruction caching.

When a request specifying an instruction address is issued from the processing circuitry, a lookup operation is performed within the level 1 cache 15 to determine whether that address matches an address of a cache line of instructions stored within the level 1 cache, and if so a cache line's worth of instructions can be returned to the processing circuitry 10. Control circuitry 20 may be provided to control the contents of the cache, and the control circuitry will include eviction control circuitry used to apply an eviction policy in order to determine cache lines whose contents can be evicted from the cache in order to make space for new content to be stored therein. In particular, when a cache line of instructions is retrieved from a lower level of cache, it may be allocated into the level 1 cache 15, and at that point it will typically be the case that a victim cache line needs to be selected whose contents are going to be discarded, whereafter the newly retrieved instructions can be stored into that cache line as a newly allocated cache line for those instructions. Any suitable eviction policy may be applied by the control circuitry 20, but in one example arrangement it will be assumed that a least recently used policy is used.

In the event of a miss within the level 1 cache, then the level 1 cache can propagate the request onto the level 2 cache 25, causing a lookup operation to be performed within the level 2 cache to determine whether the required instructions are present therein. If so, then the instructions identified by the request address can be returned to the level 1 cache for onward propagation back to the processing circuitry 10. As discussed above, those retrieved instructions from the level 2 cache will typically be allocated into a cache line in the level 1 cache, in addition to being propagated back to the processing circuitry 10.

Similarly, if a hit is not detected within the level 2 cache based on the request, then the request can be propagated on to any other additional levels of cache in the cache hierarchy, denoted by the dotted box 35, and in the absence of a hit being detected in any such levels of cache, then the request can be propagated on to main memory in order to retrieve from main memory the instructions requested. The instructions can then be propagated back through the cache hierarchy for provision to the processing circuitry 10.

As shown in FIG. 1, each of the levels of cache 15, 25, 35 will have associated control circuitry 20, 30, 40 for controlling the associated cache. The control circuitry may be responsible for performing functions such as cache maintenance operations and the like, but in addition will also be responsible for selecting victim cache lines whose contents are going to be discarded to make way for newly allocated cache contents. In the example illustrated in FIG. 1, it is assumed that the eviction control circuitry provided in association with the level 2 cache applies, as its eviction policy, a most recently read eviction policy. Hence, when a cache line is read from the level 2 cache 25 to the level 1 cache 15, a storage element is updated in order to identify the most recently read cache line.

The storage element can take a variety of forms, and could for example include a flag in association with each cache line, which is set when that cache line is the most recently read cache line. However, alternatively a storage element may be maintained in association with the control circuitry 30, in which a value can be captured identifying the cache line whose contents have been most recently read from the level 2 cache. When a cache line's worth of instructions are retrieved from a lower level of cache 35 or main memory 45 for storing into the level 2 cache 25, then the eviction control circuitry will select as the victim entry the most recently read cache line as identified in the storage element, and that cache line's contents will then be overwritten with the newly retrieved instructions.

One or more levels of the cache may have prefetch circuitry associated therewith in order to analyse the requests received by that cache, and apply prediction mechanisms to seek to predict which instructions will be requested at some point in the future. For example, various pattern analysis techniques may be used to seek to identify patterns in the addresses associated with a series of requests received by the associated cache, and to then extrapolate those patterns in order to seek to predict future addresses that will be requested. In the example of FIG. 1, it is assumed that prefetch circuitry 50 is provided in association with at least the level 2 cache 25, and is used to analyse the requests received from the level 1 cache 15 in order to predict instructions that will be requested in the future. It can then output prefetch requests via the level 2 cache 25 to the lower levels of cache 35 in order to seek to prefetch into the level 2 cache instructions that are likely to be requested in due course.

It has been found that by employing a most recently read eviction policy in association with the level 2 cache 25, the effective cache capacity represented by the level 1 cache 15 and the level 2 cache 25 can be significantly improved, without the complexity associated with known schemes for seeking to improve cache capacity. One example of such a known scheme would be to operate the level 1 cache 15 and the level 2 cache 25 as exclusive caches, so that any content stored in the level 2 cache is not stored in the level 1 cache, and vice versa. This requires significant control complexity, since it needs to be ensured that at the point a cache line is promoted from the level 2 cache to the level 1 cache, the existing content in the level 2 cache for that cache line is invalidated. Another scheme that can be used to seek to improve the effective cache capacity is to operate the level 2 cache as a victim cache, where instructions evicted from the level 1 cache are then stored into the level 2 cache. However, this also increases complexity by increasing the number of write channel paths that need to be provided into the level 2 cache, or the provision of arbitration mechanisms to arbitrate between the various paths by which instructions may be written into the level 2 cache, for example to arbitrate between prefetches and victim writes.

However, by employing a most recently read eviction policy in association with the level 2 cache, the eviction control circuitry 30 will preferentially evict content that has most recently been promoted to the level 1 cache. This has been found to provide significant benefits in many scenarios, since it is often the case that instructions promoted into the level 1 cache will remain within the level 1 cache for a period of time whilst they are frequently being referred to by the processing circuitry, and accordingly there will be no need at that time to seek to re-read the content from the level 2 cache. Further, on a larger timescale, where those instructions may in due course be evicted from the level 1 cache, the actions of the prefetch circuitry 50 can cause the instructions to be refetched into the level 2 cache in anticipation of them in due course being required again, such that by the time such a request is made by the level 1 cache, the requested instructions already reside within the level 2 cache. Hence, use of the most recently read (MRR) scheme can enable effective cache capacity increases similar to those achieved by employing a fully exclusive cache to be realised, but without the complexity associated with the management of a fully exclusive cache arrangement.

Figure 2:
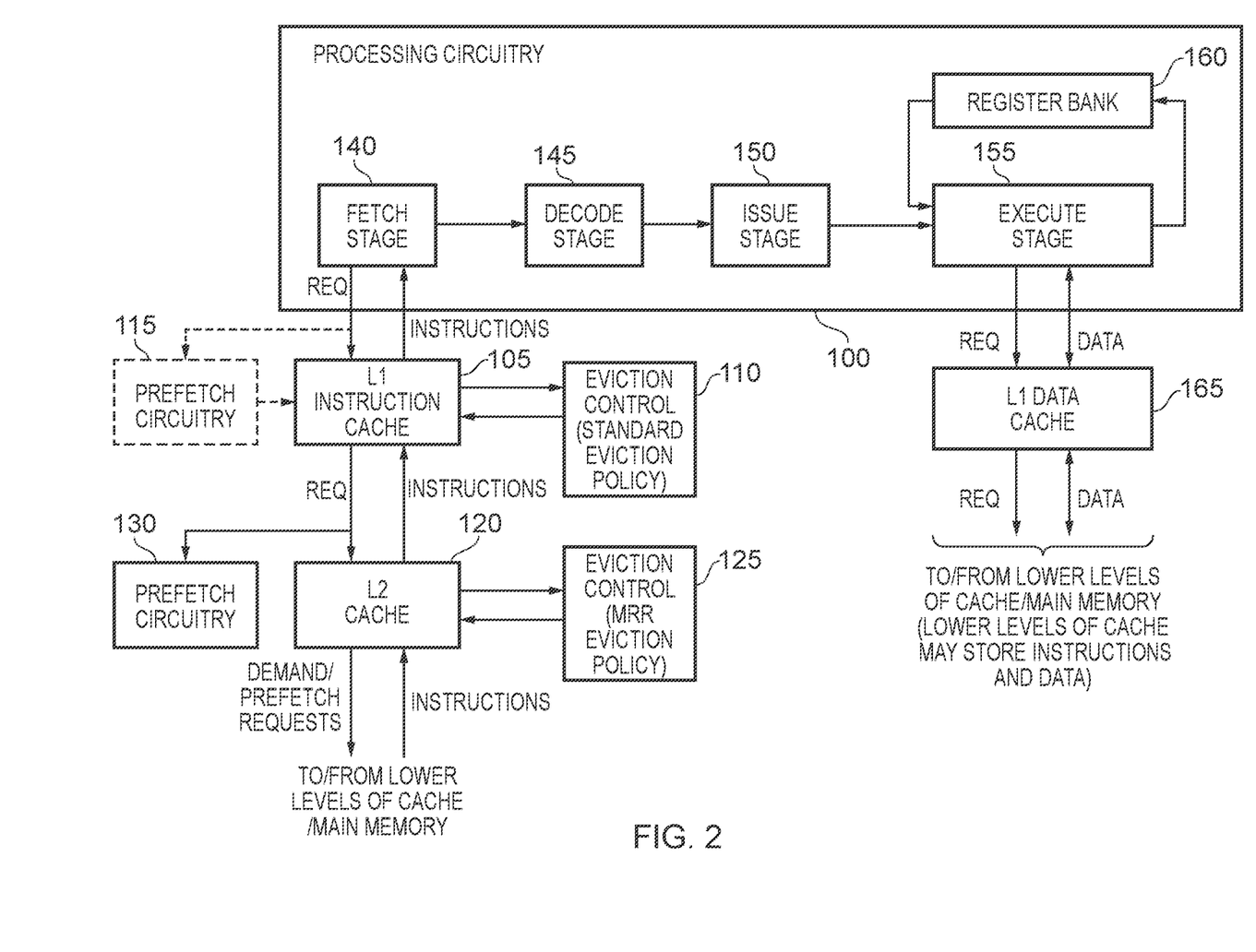
FIG. 2 is a block diagram of an apparatus in accordance with a particular example arrangement.

FIG. 2 illustrates a specific example use case, and in particular illustrates more details of the processing circuitry, and the use of separate level 1 instruction caches and data caches. The processing circuitry 100 has a fetch stage 140 that seeks to fetch from memory instructions that will be required to be executed by the processing circuitry. As will be understood by those skilled in the art, the fetch stage may have access to branch prediction circuitry and the like, that seek to predict the instruction flow through a computer program, and hence predict which instructions should be fetched next. The fetch stage will typically fetch blocks of instructions at a time, with reference to an address output in a fetch request, and those fetch requests will be issued to the level 1 instruction cache 105. In the event of a hit, the instructions will be returned to the fetch stage, whereas in the event of a miss the request will be propagated to lower levels of cache, for example the level 2 cache 120. As will be apparent from the earlier discussion of FIG. 1, the request can propagate through the cache hierarchy until the instructions are found, at which point the instructions can be returned through the cache hierarchy to the fetch stage, and those instructions can also be allocated into one or more levels of the cache. As per the discussion of FIG. 1, it is assumed that the eviction control circuitry 110 associated with the level 1 cache 105 employs a standard eviction policy, whereas the eviction control circuitry 125 associated with the level 2 cache 120 employs the earlier-discussed MRR eviction policy.

Prefetch circuitry 130 is provided in association with the level 2 cache 120 and operates as per the prefetch circuitry 50 discussed earlier with reference to FIG. 1. If desired, prefetch circuitry can also be provided in association with one or more other levels of cache, and hence for example prefetch circuitry 115 may be provided in association with the level 1 instruction cache 105. In that event, the prefetch circuitry 130 can monitor not only the demand requests issued by the level 1 instruction cache relating to instructions that have actually been requested by the fetch stage, but can also monitor the prefetch requests issued as a result of the activities of the prefetch circuitry 115, identifying instructions that are anticipated to be requested in due course by the fetch stage 140. Based on both of those activities, the prefetch circuitry 130 can then determine which instructions to prefetch into the level 2 cache 120.

Instructions that are fetched by the fetch stage 140 are then passed to a decode stage 145 where they are decoded in order to produce decoded instructions (sometimes also referred to as macro operations) which are then stored within the issue stage 150. Once the source operands are available for those decoded instructions, then those instructions can be passed to the execute stage 155 for execution. When executing instructions, the source operand values required may be retrieved from the register bank 160, and the results produced by execution of those instructions can be stored back into specified registers of the register bank 160. Load and store instructions can be executed in order to load data values from memory into the register bank, or to store data values from the register bank back into the memory system.

As shown in FIG. 2, when executing load or store instructions, the execution stage will interface with a level 1 data cache 165, and from there to one or more other lower levels of cache/main memory.

In the example shown in FIG. 2, it is assumed that at the level 1 cache level of the hierarchy, there is a separate level 1 instruction cache 105 and a separate level 1 data cache 165. Whilst separate caches could also be used at one or more other levels, in one example arrangement all of the other levels of cache, including the level 2 cache 120, may be unified caches that store both instructions and data.

If desired, prefetch circuitry can also be associated with the caches for seeking to prefetch data values that may be required in due course by the processing circuitry 100. Hence, for example, the level 2 cache 120 may have associated therewith not only the prefetch circuitry 130 used to analyse instruction requests, and prefetch instructions, but also separate prefetch circuitry used to analyse data value requests propagated on from the level 1 data cache 165, and to issue prefetch data access requests in order to seek to prefetch into the level 2 cache data values that will be requested in due course from the level 1 data cache 165.

Figure 3:
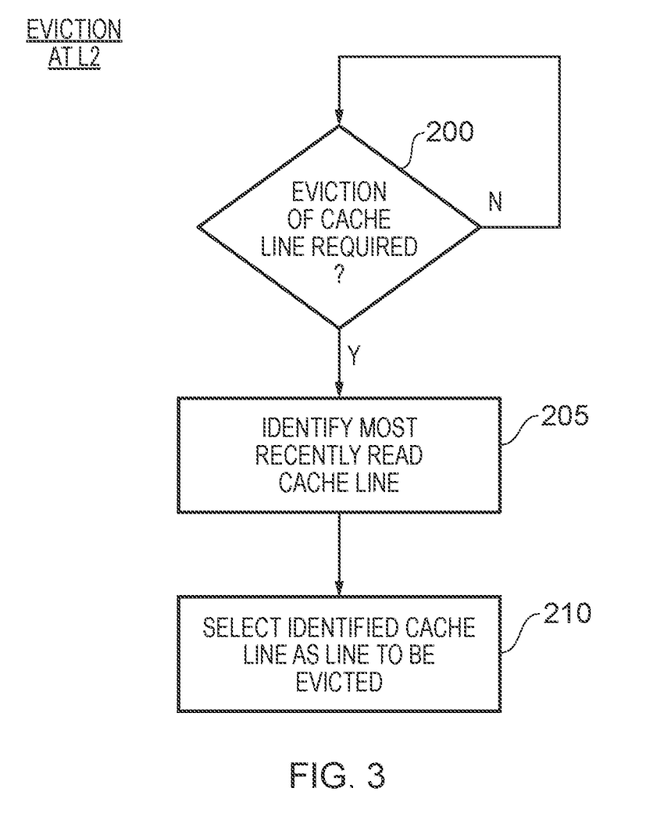
FIG. 3 is a flow diagram illustrating a process performed when evicting a cache line from the level 2 cache of FIG. 2, in accordance with one example arrangement.

FIG. 3 is a flow diagram illustrating the eviction process performed in association with the level 2 cache 120 shown in FIG. 2. At step 200, it is determined whether an eviction of a cache line is required. This may arise for a variety of reasons, for example due to cache maintenance operations, or to make room for a new allocation of a cache line's worth of instructions retrieved from a lower level of cache/main memory.

Once it is detected that an eviction of a cache line is required, then the most recently read cache line is identified at step 205. As will be discussed in more detail later, storage can be used to keep track of the most recently read cache line, to assist in the identification of the most recently read cache line at step 205.

Thereafter, at step 210, the identified cache line is selected as the line to be evicted. The eviction can be handled in a variety of ways. For example, in one particular implementation, this merely involves invalidating the current cache line contents. In particular, the instructions stored in that cache line will merely be a copy of instructions available from main memory or from some lower levels in the cache hierarchy, and accordingly they can be retrieved again in due course if required.

However, if desired, the identified cache line contents could be output for storing in a level 3 cache once they have been chosen for eviction. This would allow a more quick retrieval of that cache line contents in due course if required. For example, if in due course the prefetch circuitry 130 decided that it would be appropriate to prefetch those instructions into the level 2 cache, they may at that point still reside in the level 3 cache, and accordingly could be prefetched more quickly. This could potentially improve the accuracy of the prefetching mechanism, since the prefetching mechanism could operate less far ahead of the demand accesses, due to the reduced time taken to prefetch the instructions.

Figure 4:
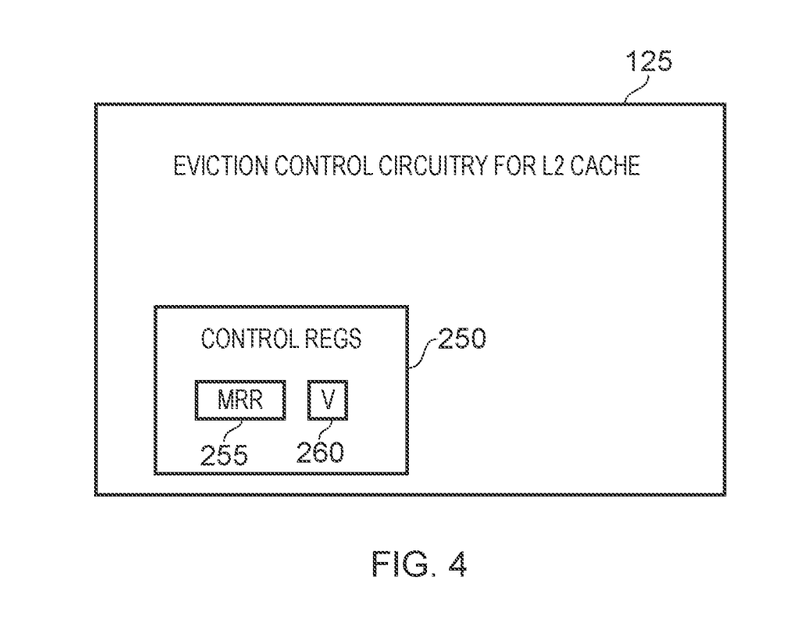
FIG. 4 is a diagram illustrating certain control registers that may be provided within the eviction control circuitry for the level 2 cache of FIG. 2, in accordance with one example arrangement.

FIG. 4 is a diagram schematically illustrating certain control registers 250 that may be provided in association with the eviction control circuitry 125 provided for the level 2 cache 120. In particular, the control registers may include a most recently read register 255 containing a sufficient number of bits to enable the most recently read cache line to be identified. Further, a valid bit 260 may be associated with the MRR register 255 to identify whether the current contents are valid or not. In one example implementation, the number of bits provided by the register 255 is loge (number of cache lines in the level 2 cache), enabling any cache line within the level 2 cache to be identified within the MRR register 255. The MRR register 255 is used to keep track of the most recently read cache line within the level 2 cache, so that that information can then be used during the eviction process.

Figure 5A:
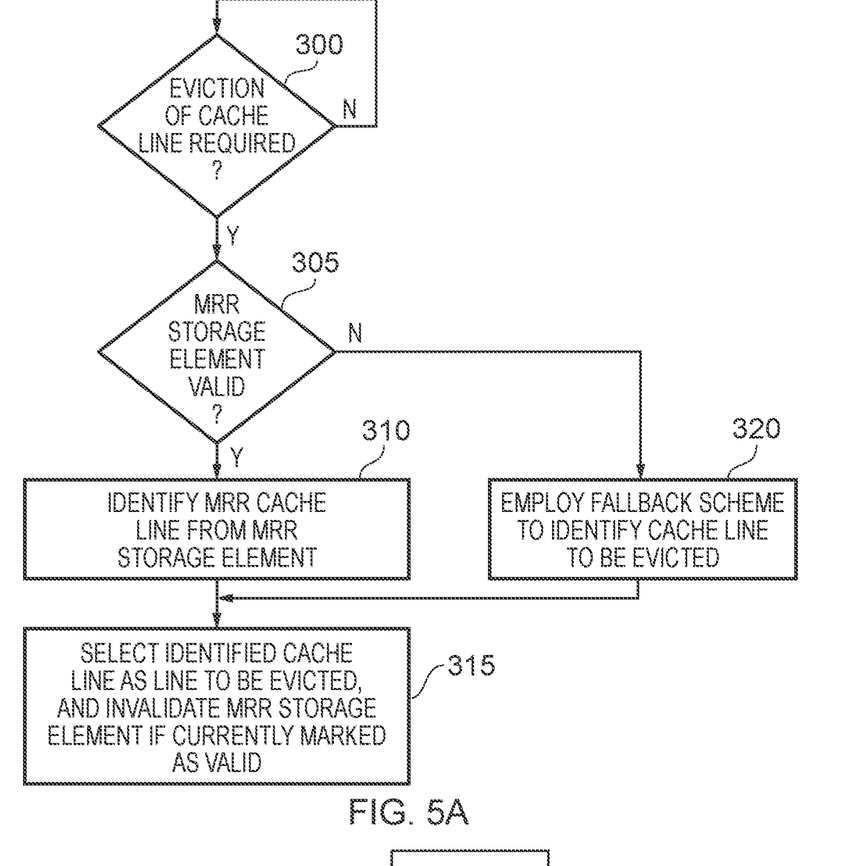
FIGS. 5A and 5B illustrate how the most recently read storage element contents may be used during eviction, and how those contents may be updated when content is read from the level 2 cache, in accordance with one example arrangement.

The eviction process employed when using the MRR register 255 of FIG. 4 may take the form shown in FIG. 5A. In particular, when at step 300 it is determined that an eviction of a cache line is required, then at step 305 it is determined whether the MRR register 255 is valid, as indicated by the value of the valid bit 260.

Assuming it is valid, then the most recently read cache line is identified from the content of the MRR register 255, and thereafter at step 315 the identified cache line is selected as the line to be evicted. Also, at this point, the MRR register can be invalidated by clearing the valid flag from the valid storage element 260.

If at step 305 it is determined that MRR register is not valid, then the process can proceed to step 320, where a fallback eviction scheme can be employed in order to identify the cache line to be evicted. Any suitable fallback scheme can be used here, and hence as a specific example a least recently used scheme could be used as the fallback scheme. The process then proceeds to step 315.

Figure 5B:
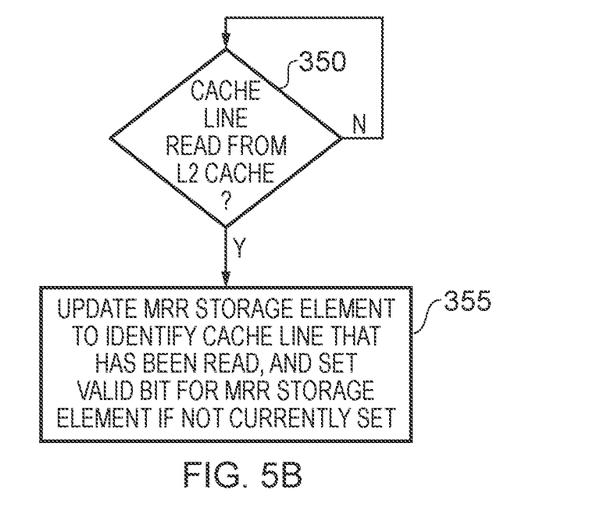

FIG. 5B illustrates a process that can be used to maintain the contents of the MRR storage element 255. At step 350, the process waits until a cache line has been read from the level 2 cache. At that point, at step 355 the MRR storage element is updated in order to identify the cache line that has been read. In addition, the valid bit 260 is set for the MRR storage element if it is not currently set. Accordingly, it will be seen that by such an approach, the MRR storage element can keep track of the most recently read cache line so that that cache line can be preferentially evicted when a cache line needs to be selected for eviction. In the event that more than one cache line needs to be selected for eviction in a relatively short period of time, during which no other cache line has been read, then the fallback scheme can be used in order to identify the subsequent cache line to be evicted.

Whilst FIG. 4 shows one example approach for keeping track of the most recently read cache line, other techniques could be used. For example, within the storage structures of the level 2 cache itself, an extra field may be provided in association with each cache line, which can be used to identify the most recently read cache line. This could be a single bit provided in association with each cache line, with only one bit being set at any particular point in time to identify the most recently read cache line. Alternatively, a multi-bit field could be used to seek to identify a sequence of most recently read cache lines, so that once the most recently read cache line is selected for eviction, it is immediately known which cache line is the next most recently read. It will also be appreciated that when the most recently read information is maintained within storage elements of control registers 250 associated with the eviction control circuitry, those storage registers could be extended so as to capture similar information, hence reducing the possibility that there will be a need to employ a fallback eviction scheme at any point in time.

Figure 6:
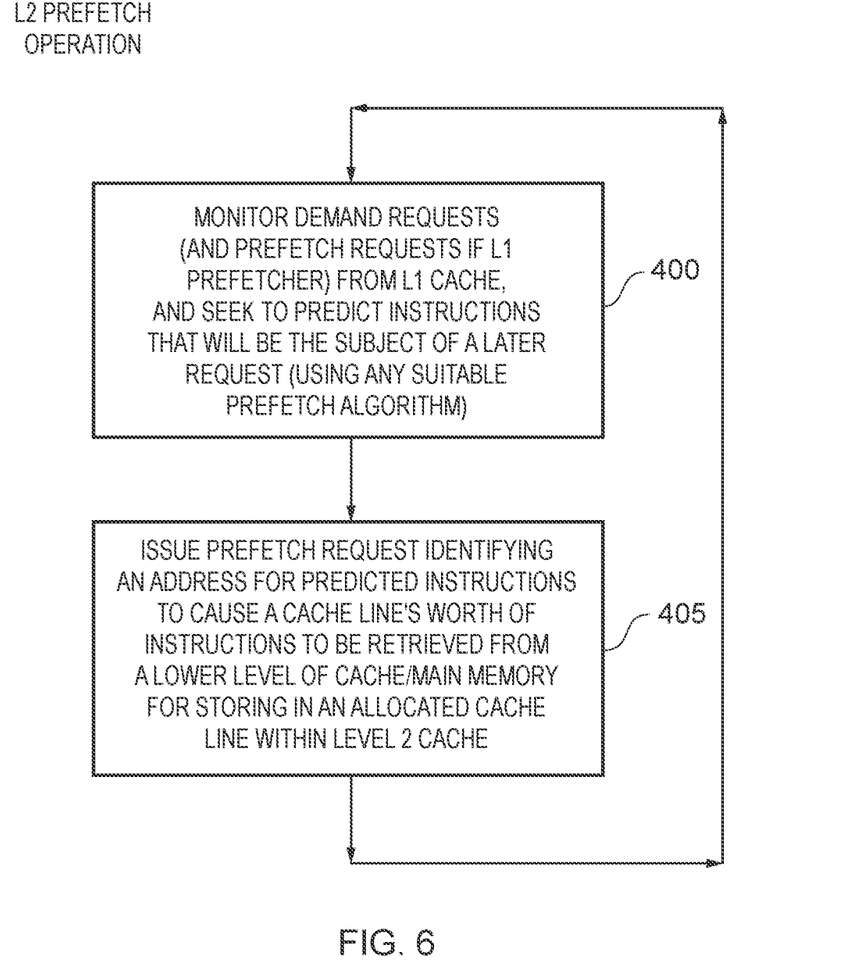
FIG. 6 is a flow diagram illustrating a prefetch operation performed by the prefetch circuitry associated with the level 2 cache of FIG. 2, in accordance with one example arrangement.

FIG. 6 illustrates a level 2 prefetch operation that may be employed by the prefetch circuitry 130. At step 400, the prefetch circuitry 130 monitors the demand requests issued from the level 1 instruction cache 105 and seeks to predict instructions that will be the subject of a later request. Any suitable prefetch algorithm can be used here, and as discussed earlier such prefetch algorithms typically seek to identify patterns in the addresses being requested, and to then extrapolate those patterns in order to identify the addresses that are likely to be associated with later requests. If prefetch circuitry 115 is also provided in association with the level 1 instruction cache 105, the prefetch circuitry 130 can monitor not only the demand requests from the level 1 cache, but also the prefetch requests issued as a result of the activities of the level 1 prefetch circuitry 115.

At step 405, prefetch requests are then issued from the level 2 cache 120/prefetch circuitry 130 to identify an address for the predicted instructions in order to cause a cache line's worth of instructions to be retrieved from a lower level of cache or main memory for storing in an allocated cache line within the level 2 cache 120. This process is then repeated on an ongoing basis in order to continually seek to prefetch instructions into the level 2 cache that are expected to be requested in due course via the level 1 instruction cache 105.

As discussed earlier, it would also be possible to provide data prefetch circuitry in association with the level 2 cache 120, assuming the level 2 cache is used to store both instructions and data. In that event, the data prefetch circuitry would be monitoring the demand (and if provided, prefetch) requests from the level 1 data cache 165 and seek to predict the data to be prefetched into the level 2 cache. Whilst the MRR eviction policy discussed herein is described as being applied in respect of the cache lines containing instructions, and in particular keeps track of the most recently read cache line of instructions retrieved into the level 1 instruction cache 105, if desired the MRR scheme could also be applied in association with eviction of cache lines containing data. By such an approach, it may be possible to increase not only the effective cache capacity associated with the storage of instructions, but also the effective cache capacity relating to the storage of data values.

Figure 7:
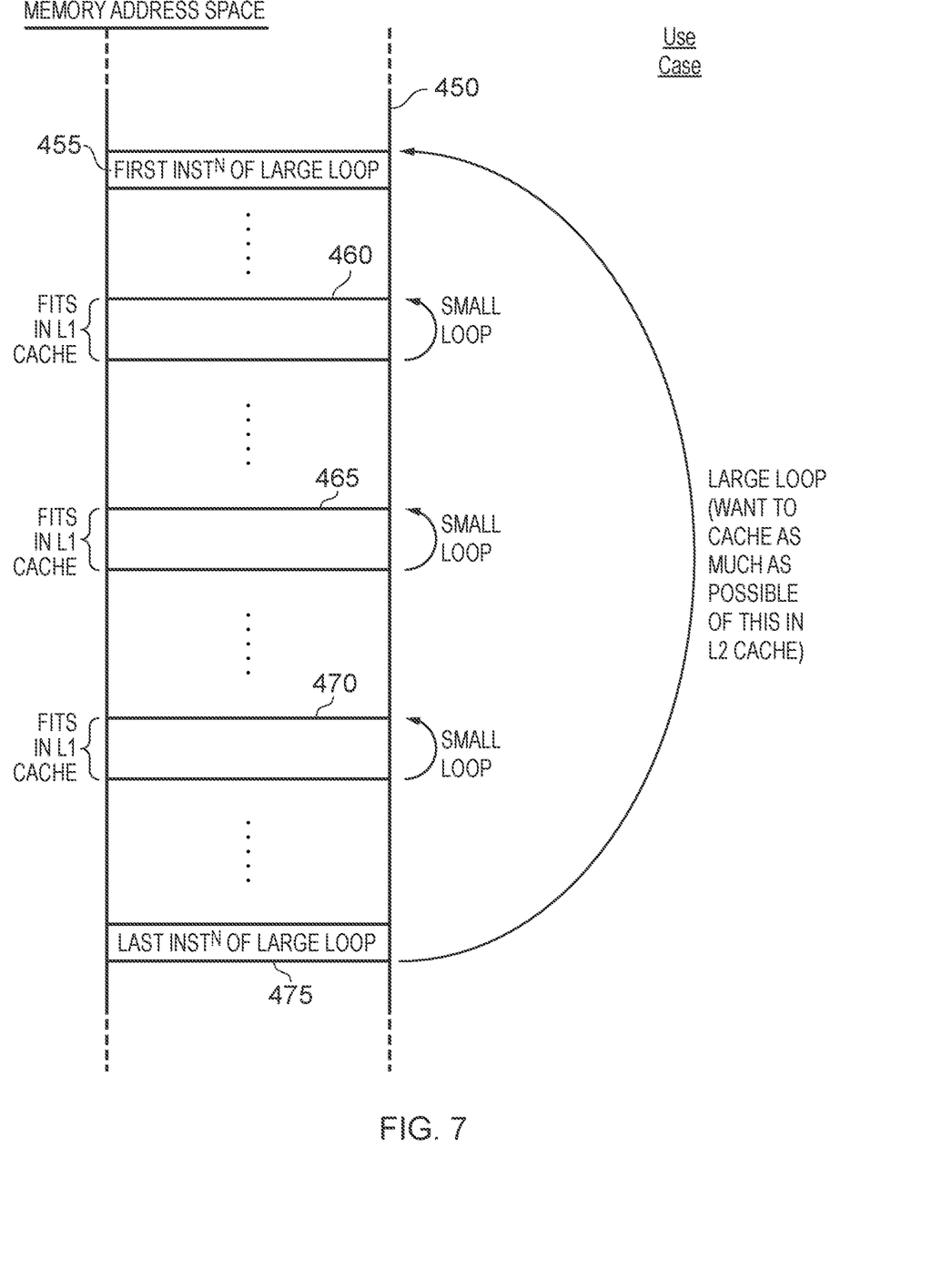
FIG. 7 schematically illustrates an example code sequence for which the techniques described herein provide an efficient mechanism for caching the instructions required in order to execute that code sequence.

FIG. 7 illustrates an example use case, and in particular shows a section of code between instructions 455 and 475 in the memory address space 450, that section of code forming a large loop that will be repeatedly executed by the processing circuitry. Within the large loop, a number of smaller loops 460, 465, 470 are provided. The level 1 instruction cache 105 may be of a sufficient size to store all of the instructions from any one of the small loops 460, 465, 470. However, this is not possible for the large loop, and it is desirable for the level 2 cache to cache as much as possible of that large loop. As a result, a larger level 2 cache will be a bonus. By employing the earlier-discussed most recently read eviction policy, the effective cache capacity of the level 2 cache can be increased. In particular, by evicting the most recently read cache lines from the level 2 cache, there is a significant likelihood that these cache lines will still be resident within the level 1 cache at the time they are evicted. Particularly for the instructions within the small loops 460, 465, 470 that will be consumed multiple times in fairly rapid succession, those instructions can be retained within the level 1 cache, and accordingly will not need to be read again from the level 2 cache until the next time the large loop is executed.

The prefetch circuitry 130 can be used to predict the instructions that will be the subject of future requests from the fetch stage, and accordingly can manage the prefetching into the level 2 cache 120 of the instructions that will be required in respect of the larger loop. This will include in due course prefetching into the level 2 cache instructions associated with the smaller loops 460, 465, 470 so that when they are encountered for the first time on a next iteration of the large loop, and a fetch request is hence issued by the level 1 instruction cache 105, those instructions will already reside within the level 2 cache, and accordingly can be refetched into the level 1 instruction cache. At that time, the most recently read eviction policy will again ensure that those cache line contents are then evicted from the level 2 cache.

FIG. 7 is intended to illustrate just one example use case where the use of a most recently read eviction policy in association with the level 2 cache can give rise to a significant increase in the effective capacity of the cache, without the complexities associated with the use of an exclusive cache arrangement in combination with the level 1 instruction cache, or the write path/arbitration complexities that would be associated with using the level 2 cache as a victim cache. The described technique hence provides a particularly efficient and effective mechanism for increasing the effective capacity of caches within a cache hierarchy. There are a wide variety of scenarios where such effective cache capacity increases can be achieved when using the most recently read eviction policy described herein in respect of one or more of the levels of cache, and FIG. 7 is merely intended as one specific example.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute instructions;
a cache hierarchy to store content for access by the processing circuitry when executing the instructions, the cache hierarchy comprising a plurality of levels of cache including a highest level of cache that is accessed prior to the other levels of cache in response to a request from the processing circuitry; and
eviction control circuitry provided in association with each level of cache, where the eviction control circuitry associated with a chosen level of cache other than the highest level of cache is arranged to implement a most recently read eviction policy that causes content most recently read from the chosen level of cache to be selected for eviction from the chosen level of cache.

2. An apparatus as claimed in claim 1, further comprising:
prefetch circuitry provided in association with the chosen level of cache to prefetch content into the chosen level of cache in anticipation of a request for that content being received by the chosen level of cache.

3. An apparatus as claimed in claim 1, wherein the content stored in the cache hierarchy comprises instructions to be executed by the processing circuitry.

4. An apparatus as claimed in claim 1, wherein the content stored in the cache hierarchy comprises data processed by the processing circuitry when executing the instructions.

5. An apparatus as claimed in claim 1, wherein the eviction control circuitry provided in association with the highest level of cache implements an eviction policy other than the most recently read eviction policy.

6. An apparatus as claimed in claim 1, wherein the chosen level of cache is a level of cache adjacent to the highest level of cache.

7. An apparatus as claimed in claim 1, wherein the content is read from the chosen level of cache in response to an access request issued in association with an adjacent higher level of cache.

8. An apparatus as claimed in claim 7, wherein the access request issued in association with the adjacent higher level of cache is at least one of a demand access request issued by the adjacent higher level of cache, and a prefetch request issued by prefetch circuitry provided in association with the adjacent higher level of cache.

9. An apparatus as claimed in claim 1, wherein the eviction control circuitry associated with at least one further level of cache other than the highest level of cache is also arranged to implement the most recently read eviction policy in order to cause content most recently read from that at least one further level of cache to be selected for eviction from that at least one further level of cache.

10. An apparatus as claimed in claim 1, wherein the content is stored in cache lines, and the most recently read eviction policy causes a cache line containing content most recently read from the chosen level of cache to be selected for eviction from the chosen level of cache.

11. An apparatus comprising:
processing means for executing instructions;
cache hierarchy means for storing content for access by the processing means when executing the instructions, the cache hierarchy means comprising a plurality of levels of cache including a highest level of cache that is accessed prior to the other levels of cache in response to a request from the processing means; and eviction control means provided in association with each level of cache, where the eviction control means associated with a chosen level of cache other than the highest level of cache is for implementing a most recently read eviction policy that causes content most recently read from the chosen level of cache to be selected for eviction from the chosen level of cache.

12. A method of managing a cache hierarchy within an apparatus, comprising:

providing processing circuitry to execute instructions;

employing the cache hierarchy to store content for access by the processing circuitry when executing the instructions, the cache hierarchy comprising a plurality of levels of cache including a highest level of cache that is accessed prior to the other levels of cache in response to a request from the processing circuitry; and arranging eviction control circuitry associated with a chosen level of cache other than the highest level of cache to implement a most recently read eviction policy that causes content most recently read from the chosen level of cache to be selected for eviction from the chosen level of cache.

* * * * *